US 008645741B2

(12) United States Patent
Vonog et al.

(10) Patent No.: US 8,645,741 B2
(45) Date of Patent: Feb. 4, 2014

(54) METHOD AND SYSTEM FOR PREDICTING A LATENCY SPIKE CATEGORY OF AUDIO AND VIDEO STREAMS TO ADJUST A JITTER BUFFER SIZE ACCORDINGLY

(75) Inventors: Stanislav Vonog, San Francisco, CA (US); Nikolay Surin, San Francisco, CA (US); Vadim Shtayura, San Francisco, CA (US); Timur Iskhodzhanov, San Francisco, CA (US)

(73) Assignee: Net Power and Light, Inc., San Francisco, CA (US)

( * ) Notice: Subject to any disclaimer, the term of this patent is extended or adjusted under 35 U.S.C. 154(b) by 0 days.

(21) Appl. No.: 13/523,708

(22) Filed: Jun. 14, 2012

(65) Prior Publication Data

US 2012/0254649 A1 Oct. 4, 2012

Related U.S. Application Data

(60) Continuation of application No. 13/087,167, filed on Apr. 14, 2011, now Pat. No. 8,225,127, which is a division of application No. 12/024,089, filed on Jan. 31, 2008, now Pat. No. 7,949,890.

(60) Provisional application No. 60/887,555, filed on Jan. 31, 2007.

(51) Int. Cl.
*G06F 1/12* (2006.01)
*G06F 1/00* (2006.01)

(52) U.S. Cl.
USPC .......................................... 713/400; 713/500

(58) Field of Classification Search
USPC ................................................ 713/400, 500
See application file for complete search history.

(56) References Cited

U.S. PATENT DOCUMENTS

| 5,452,435 | A | 9/1995 | Malouf et al. |
| 6,433,835 | B1 | 8/2002 | Hartson et al. |
| 6,456,782 | B1 | 9/2002 | Kubota et al. |
| 7,949,890 | B2 | 5/2011 | Vonog et al. |
| 8,225,127 | B2 | 7/2012 | Vonog et al. |
| 2002/0101885 | A1* | 8/2002 | Pogrebinsky et al. ......... 370/516 |
| 2006/0061368 | A1* | 3/2006 | Furse et al. .................. 324/519 |
| 2006/0111899 | A1 | 5/2006 | Padhi et al. |
| 2006/0271373 | A1 | 11/2006 | Khalil et al. |
| 2008/0181260 | A1 | 7/2008 | Vonog et al. |
| 2008/0285599 | A1* | 11/2008 | Johansson et al. ............ 370/516 |
| 2011/0258474 | A1 | 10/2011 | Vonog et al. |

OTHER PUBLICATIONS http://ieeexplore.ieee.org/stamp/stamp.jsp?tp=&arnumber=1391784, "An Adaptive Receiver Buffer Adjust Algorithm for VoIP Applications Considering Voice Characters", 5 pages, Dated Aug. 24, 2004.*

(Continued)

*Primary Examiner* — Thomas Lee
*Assistant Examiner* — Phil Nguyen
(74) *Attorney, Agent, or Firm* — Perkins Coie LLP

(57) ABSTRACT

Described are the architecture of such a system, algorithms for time synchronization during a multiway conferencing session, methods to fight with network imperfections such as jitter to improve synchronization, methods of introducing buffering delays to create handicaps for players with faster connections, methods which help players with synchronization (such as a synchronized metronome during a music conferencing session), methods for synchronized recording and live delivery of synchronized data to the audience watching the distributed interaction live over the Internet.

20 Claims, 5 Drawing Sheets

(56) References Cited

OTHER PUBLICATIONS http://ieeexplore.ieee.org/stamp/stamp.jsp?arnumber=01554146, "An Adaptive Receiver Buffer Adjust Algorithm for Voice & Video on IP Applications", 5 pages, Dated Oct. 5, 2005.* http://link.springer.com/chapter/10.1007%2F978-3-540-30193-6_3, "Predicting the Perceptual Service Quality Using a Trace of VoIP Packets" 10 pages, Dated Sep. 2004.*

Notice of Allowance Mailed Mar. 23, 2011 in Co-Pending U.S. Appl. No. 12/024,089 of Vonog, S., et al., filed Jan. 31, 2008.

Co-Pending U.S. Appl. No. 12/024,089 of Vonog, S., et al., filed Jan. 31, 2008.

Notice of Allowance Mailed May 23, 2012 in Co-Pending U.S. Appl. No. 13/087,167 of Vonog et al., filed Apr. 14, 2011.

Co-Pending U.S. Appl. No. 13/087,167 of Vonog, S., et al., filed Apr. 14, 2011.

* cited by examiner

METHOD AND SYSTEM FOR PREDICTING A LATENCY SPIKE CATEGORY OF AUDIO AND VIDEO STREAMS TO ADJUST A JITTER BUFFER SIZE ACCORDINGLY

CROSS-REFERENCE TO RELATED APPLICATIONS

This application is a continuation application of U.S. patent application Ser. No. 13/087,167, filed Apr. 14, 2011, entitled "METHOD AND SYSTEM FOR PRECISE SYNCHRONIZATION OF AUDIO AND VIDEO STREAMS DURING A DISTRIBUTED COMMUNICATION SESSION WITH MULTIPLE PARTICIPANTS, which is a divisional application of U.S. patent application Ser. No. 12/024,089, filed Jan. 31, 2008, now issued as U.S. Pat. No. 7,949,980 issued on May 24, 2011, entitled METHOD AND SYSTEM FOR PRECISE SYNCHRONIZATION OF AUDIO AND VIDEO STREAMS DURING A DISTRIBUTED COMMUNICATION SESSION WITH MULTIPLE PARTICIPANTS. This application is a non-provisional application and claims priority to U.S. Provisional Patent Applications No. 60/887,555, filed Jan. 31, 2007, and entitled "METHOD AND SYSTEM FOR LOW LATENCY HIGH QUALITY MUSIC CONFERENCING" by Surin et al, all of which are herein incorporated by reference.

BACKGROUND

Synchronization is critical to many aspects of distributed communications. In a multiway audio video conferencing session it is important to keep audio and video streams from all the participants in synch with each other as well as pay special attention to audio and video synchronization. In gaming applications it is important to synchronize clocks and multimedia data sent between the players, handicap players with faster connection so that everybody in the system plays in the common time frame.

It is highly desirable in the above applications to implement synchronization methods to fight with network imperfections such as jitter and other delays affecting the quality of audio and/or video stream due to increasing synch latency. The current invention addresses some of the toughest problems regarding synchronization in a multiway multimedia communication system. The examples of such a system can be in audio/video conferencing, live music concerts by remote musicians playing together over the Internet, as well as multi-player gaming.

SUMMARY

Described are the architecture of such a system, algorithms for time synchronization during a multiway conferencing session, methods to fight with network imperfections such as jitter to improve synchronization, methods of introducing buffering delays to create handicaps for players with faster connections, methods which help players with synchronization (such as a synchronized metronome during a music conferencing session), methods for synchronized recording and live delivery of synchronized data to the audience watching the distributed interaction live over the Internet.

DETAILED DESCRIPTION

Figure 1:
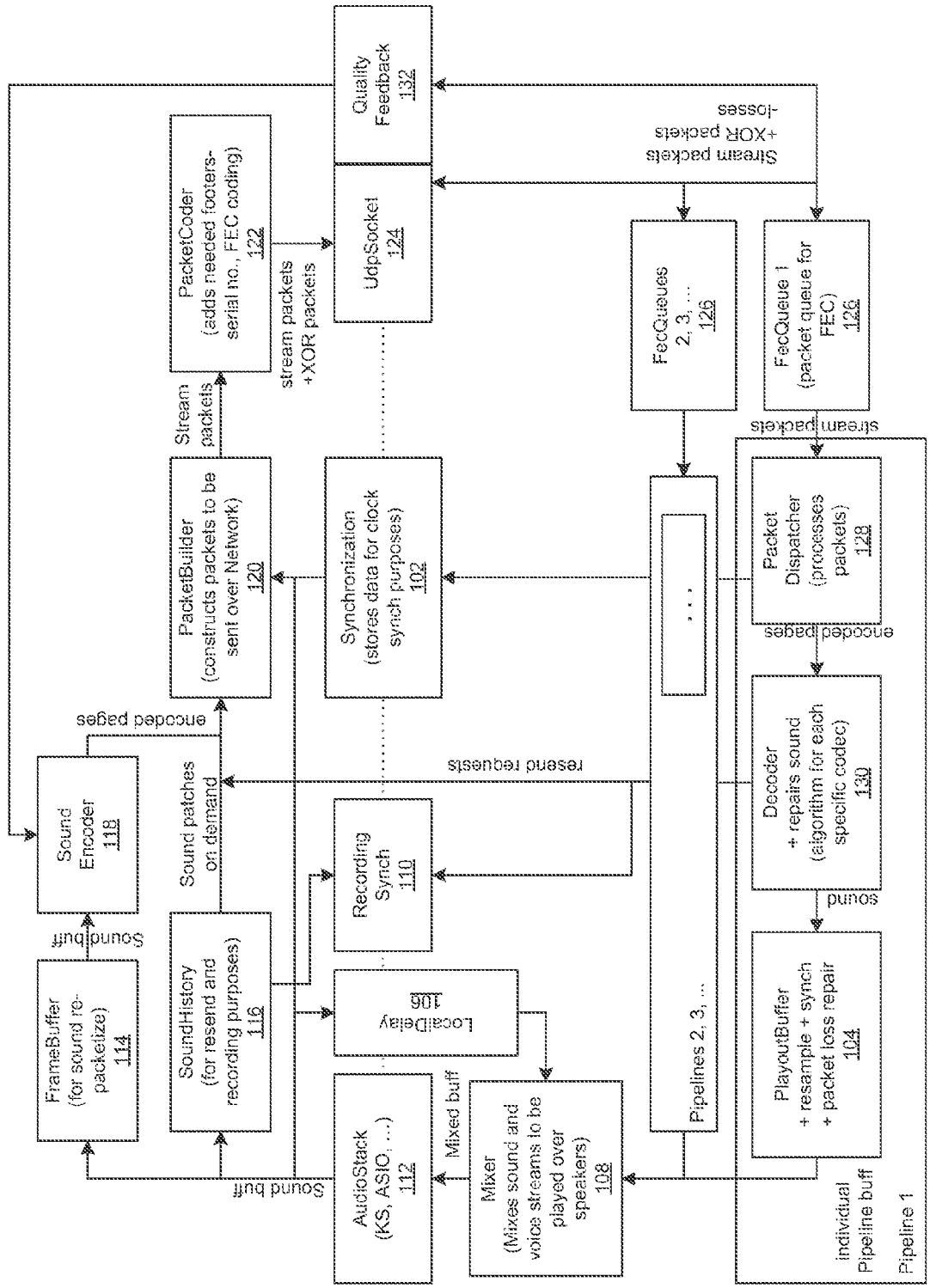
FIG. 1 depicts an example of synchronized multi-way audio and video conferencing system audio pipeline architecture.

FIG. 1 depicts an example of synchronized multi-way audio and video conferencing system audio pipeline architecture. Among most important modules for the precise synchronization of audio and video streams are the following (marked with bold borders on the diagram):

1. Synchronization Module 102
2. Playout Buffer Module 104
3. Local Delay Module 106
4. Mixer Module 108
5. Recording Synch Module 110

These 5 major components are described in detail in separate sections of this document below.

The purpose of other components in the pipeline architecture is as follows:

1. AudioStack 112: captures input sound, passes it to three components: LocalDelay 106, FrameBuffer 114, SoundHistory 116; also it passes a sound rendered by Mixer to output (speakers). The pipeline is implemented to support various audio interfaces such as ASIO or Kernel Streaming to communicate with the kernel mode audio stack. An example of an audio stack 112 is a low latency high quality audio stack described in 2007/0223675 patent application.

2. FrameBuffer 114: Stores a sound from inputs of AudioStack 112—to be used by Encoder 118 with possibly different buffer sizes.

3. Encoder 118: gets needed quantity of sound from FrameBuffer 114 using blocking Render( ) method, then encodes it with selected options, produces an encoded page and passes it to PacketBuilder 120.

4. PacketBuilder 120: builds packets to be passed over Network. When a new encoded page is received, it adds synchronization data (see the corresponding section). It also adds audio re-send requests into the outgoing packets in case of packet loss.

5. PacketCoder 122: adds packet header: packet serial number, bytes sent and so on. Also it produces FEC XOR packet based on each "n" packets passed. All the "n" packets with FEC XOR packets are sent to all the participating hosts using UdpSocket 124 (relayed or multi-send "multicast emulation", see the corresponding section).

6. FecQueue 126: Network receives packets from UdpSocket 124 and puts it to the FecQueue 126 corresponding to the sender's connection. FecQueue is used to "buffer" network packets and to correct packet drops using FEC XOR packets. When simple packet or XOR packet is received, it determines if "next" packet can be produced (already exists or can be recovered using FEC XOR packet) and if so passes it to the PacketDispatcher 128 of the corresponding receive pipeline.

7. PacketDispatcher 128: splits received packets into encoded page, synch data and re-send requests. This very component does the processing of the synchronization section data and then passes the encoded page to the Decoder 130. The re-send requests are directed to the PacketBuilder 120 to re-send the lost packet (packet not delivered to the session peer).

8. Decoder 130: performs decoding process and also sound repair in case of packet loss (if the codec supports this). Passes decoded and repaired portion of sound to the Playout Buffer 104. On successful decoding: puts the sound portion to the Recording component, otherwise puts a "sound resend" request to the PacketBuilder.

The same pipeline architecture is used for handling video streams. The audio and video pipelines share the following modules:
1. Synchronization 102
2. Mixer 108
3. RecordingSynch 110
4. QualityFeedback 130

The following modules share the common functioning principles, yet handle audio and video data using similar yet different algorithms in audio and video pipelines:
1. PacketBuilder 118
2. PacketCoder 122
3. PacketDispatcher 128
4. FecQueue 126
5. FrameBuffer 114

A receiving pipeline is used for each incoming connection. The playout buffers 104 share their "I want to keep this delay" values and keep the shared delay. If some of the playout buffers 104 "can keep" the delays more than the comfortable one (option selected by the user), their "I want to keep" delays are thrown away when calculating the shared delay value. This shared delay value is the one to be passed to the LocalDelay module 106 as the network delay. If some of the playout buffers 104 can keep delay less than the shared delay value, it keeps the delay equal to the shared delay.

Figure 2:
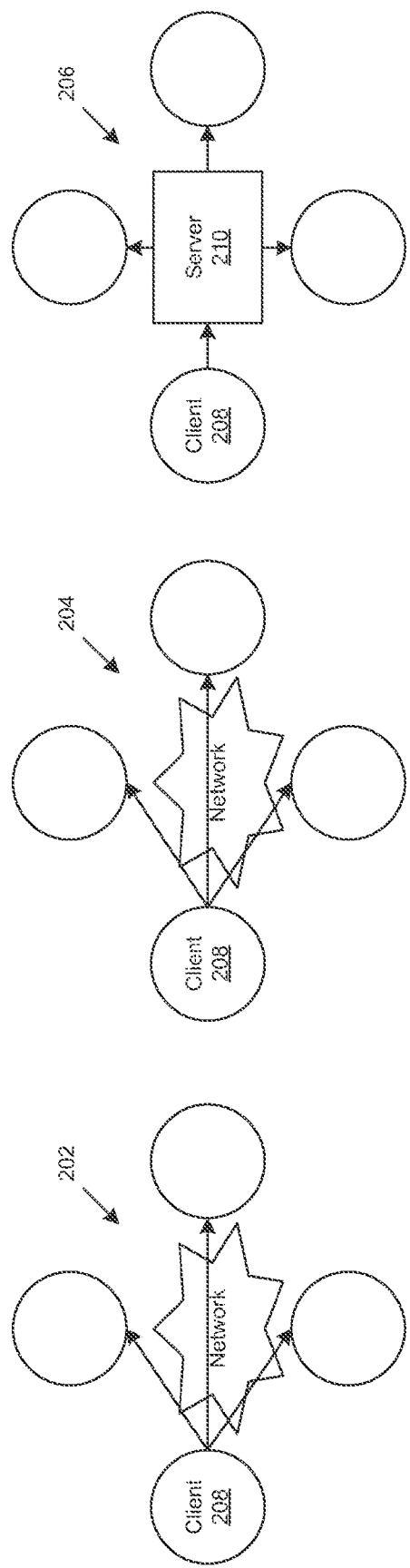
FIG. 2 depicts an example of a Multicast, Copy-send, and Relayed Multicast in case of N=4.

FIG. 2 depicts an example of a Multicast 202, Copy-send 204, and Relayed Multicast 206 in case of N=4. Each client 208 sends its outgoing stream to all other peers in the jam session. If UDP multicasting is available, it is used for audio streaming 202. Otherwise, it sends N-1 copies of each packet to all N-1 participating computers 204. If the uplink bandwidth is not sufficient to send N-1 packets directly to all other participating computers, the relay server 210 is used 206. When the relay server 210 is used, the client 208 sends only one outgoing stream to the relay server 210 and the relay server 208 re-sends the packets to all other participating computers. The relay server should be selected from the server pool in the way that has the minimal network latency among the connections in the jam-session (min max latency).

I. Synchronization Module: A Common Time System Algorithm for a Distributed Audio/Video Conferencing Session With Multiple Participants There is a problem that clock generators on different computers are not working exactly synchronously. Moreover, even if we synchronize the 2 PC clocks exactly at a given moment the difference in time can be as high as 20 ms after 10 minutes. This happens due to the fact that the embedded clocks on different PC have slightly different accuracies. 20 ms of synch latency during 10 minutes is quite a lot: if a distributed broadcast lasts for an hour without interruption the total latency generated due to differences in clock generators will total as much as 120 ms which would make the performance impossible practically after half an hour. In order to address this problem an algorithm of precise computer clock synchronization was invented. As a universal time measure Ti for a Synchronized Multi-Way Audio and Video Conferencing session the number of sound samples played from the beginning of music session divided by the audio card's sample rate is used.

Let t be the absolute time (here we neglect the effects of Einstein's relativity theory), then for each computer in the network its local time Ti is $$Ti(t) = (1 + r(t)) * t + c_0(t),$$ Equation 1 where r is a specific, almost constant, value for each computer with a uniform distribution between computers; the order of r is $10^{-4}$ sec; r and $c_0$ are functions of t.

The time source we use for audio is the amount of sound itself. Number of samples can be converted into convenient time by dividing it by sample rate (e.g. 48000 samples per second). The sound is divided by the audio driver into buffers of a constant size (e.g. 256 samples≈5.3 ms), so the "audio time" increases with steps equal to buffer size (in ms). In order to have "smoother" time, between the moments of buffer change the "local time" is interpolated using the system clock the following way:
1. Set the last LocalTimeResult the value of 0.
2. With each audio buffer change, the value of Tstart is set getSystemTime( )
3. getLocalTime( ) returns value of max(lastLocalTimeResult, min(getSystemTime( )−Tstart, BufferSizeInMs)+NumberOfSamples/SampleRate) and stores this value to the lastLocalTimeResult variable, where BufferSizeInMs is audio card buffer size in ms, SampleRate is in kHz.

Figure 3:
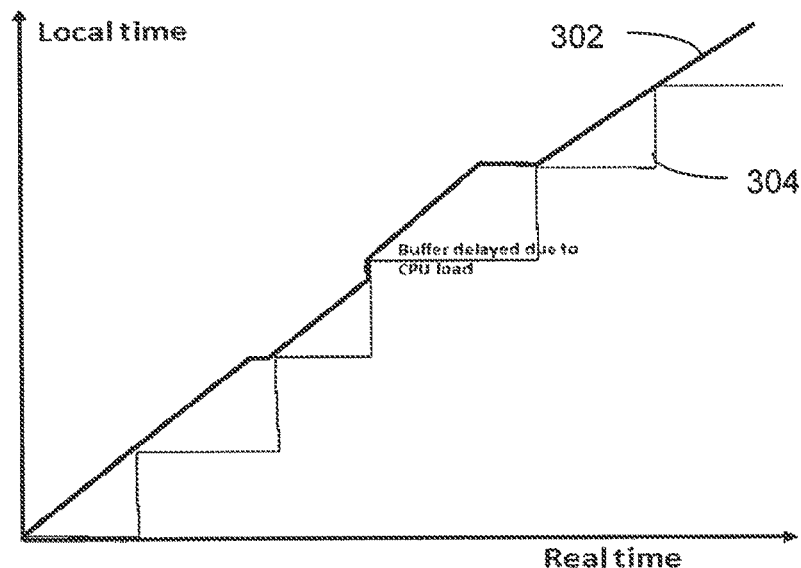
FIG. 3 depicts an example of a smoother local time calculation result (bold line).

This allows for smoother local time calculation than simply using "NumberOfSamples/SampleRate". FIG. 3 depicts an example of a smoother local time calculation result (line 302 compared to stepwise line 304) using the above method.

The algorithm synchronizes Synchronized Multi-Way Audio and Video Conferencing session time □ on each participating computer by adding a correction value ΔTi to local time Ti.

$$\square(t) = T_i(t) + \Delta T_i$$ Equation 2

In order to synchronize capture and render times of the local sound with (non-synchronized) sound streams of the remote participants the algorithm uses slightly changes the reading sample rate of the remote sound stream (by throwing away or adding 1 sample per 10 ms). The resampling of order of 0.02% is indistinguishable: 48000 samples per second are resampled either to 48010 or 47990.

Figure 4:
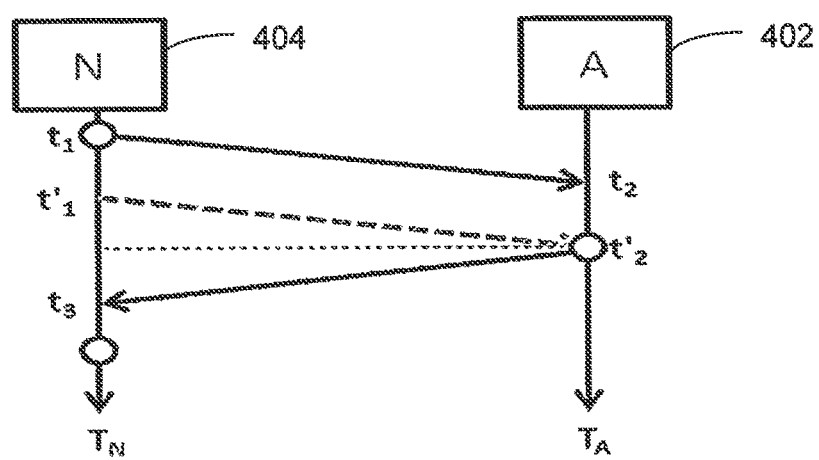
FIG. 4 depicts a diagram of example clock synchronization, where white circles show the moments the computers are ready to send audio packets.

FIG. 4 depicts a diagram of example clock synchronization, where white circles show the moments the computers are ready to send audio packets. The algorithm to determine $\Delta T_i$ for a pair of computers where one of them is treated as an "absolute time" generator is as follows:
1. One of the computers is defined to be the computer with the "absolute time" (A) 402, all the others are "non-absolute" (N) 404.
2. Let $RTT_{app}$ be the current best approximation of the network Round-Trip-Time between computers N 404 and A 402.
3. Computer A 402 has the $t_{A,last}$ and $t_{N,last}$ registers with initial values set to 0
4. Periodically (with the period of several seconds) the computers exchange synchronization packets and measure round-trip time RTT. If RTT is more than a $D = 1.05 * RTT_{app}$ then the synchronization cycle is discarded because a jitter spike is likely to have occurred. The algorithm is as follows:

Before sending each audio packet to the computer A 402, the computer N 404 computes $t_1$=getLocalTimeN( ); and writes $t_1$ into the synchronization section (synchronization request). When computer A receives the packet, computes $t_2$=getLocalTimeA( ). If $t_1 > t_{N,last}$, sets $t_{A,last}$ the value of t2 and sets $t_{N,last}$ the value of $t_1$ from the packet. Before sending each audio packet to the computer N, the computer A calculates $t'_2$ and writes $(t'_1 = t_1 + t'_2 - t_2, t'_2)$ into the synchronization section (synchronization reply) if such a reply wasn't sent for this value of $t_{N,last}$.

When computer N receives packet with $(t'_1, t'_2)$, do the following:

1. Compute $t_3$=getLocalTimeN( ).
2. Computer N calculates RTT=$t_3 - t'_1$.
3. If $RTT_{app}$ value is undefined, assign $RTT_{app}$ the value of RTT.
4. If RTT<1.05* $RTT_{app}$, assign $RTT_{app}$ the value of min ($RTT_{app} + RTT_{drift}$, RTT), otherwise go to step 1.
5. In case of ideal synchronization (r is not a function of t) $t'_2 \approx (t'_{1+t3})/2$ where the error is much less than $(t_3 - t'_1)/2$ and this is the reason why we discarded the "slow" round-trips (RTT>D=1.05 * $RTT_{app}$).
6. Let $\Delta T_{N-A}(t)$ be the mean value of $(t'2-(t'1+t3)/2)$ for the last 1000 cycles (or less, if not enough data is buffered yet).
7. Assign $\Delta T_N$ the value of $\Delta T_{N-A}$ for the computer N.
8. Calculate corrected session time for the computer N as the following:

$$\Delta(t) = T_N(t) + \Delta T_N.$$

Computer A keeps $\Delta T_A$ equal to 0. $RTT_{drift}$ is introduced in order to adapt to possible growth of packet round trip time (e.g. due to a change of packet routing). The inventors have experimentally found the value of RTTdrift to be 1 ms divided by the synchronization cycle rate in Hz. As the synchronization replies store both the answer and the request time, there's no need for any sequence identification numbers.

Synchronization information is added to each data packet so that the Synchronized Multi-Way Audio and Video Conferencing session times on participating computers can be synchronized to a very high degree of precision (equal to computer clock definition).

The above algorithm is asymmetric, because one computer uses a correction to its local time to calculate the Synchronized Multi-Way Audio and Video Conferencing session time and the other doesn't. Suppose we have computers B and C. In order to synchronize them in a symmetric way two simultaneous synchronization algorithms described above are used with the following modification:

1. Computer B treats computer C as absolute, calculates $\Delta T_{B-C}$ using the above procedure and $\Delta T_B = \Delta T_{B-C}/2$.
2. Computer C treats computer B as absolute, calculates $\Delta TC-B$ using the above procedure and $\Delta T_C = \Delta T_{C-B}/2$.
3. For the sake of optimization, both computers make only synchronization replies after they receive first synchronization requests.

In case of N computers' synchronization, there are the following additions:

1. Each computer i synchronizes with all the others using the above symmetric algorithm and calculates $\Delta T_i = \Sigma \Delta T_{i-j}/N$, where $\Delta T_{i-i} = 0$
2. For the N-way case we use multicasting, N-sends or relay multicasting as shown in FIG. 2. Thus, all the packets from any of the computers are sent with the same data. To allow for this the synchronization reply format is slightly changed, now it incorporates also the identification number of the sender of the request replying. Synchronization request format is unchanged in the N-way case.
3. Each computer makes synchronization replies to all the others in a round-robin manner.

II. Playout Buffer Module

Figure 5:
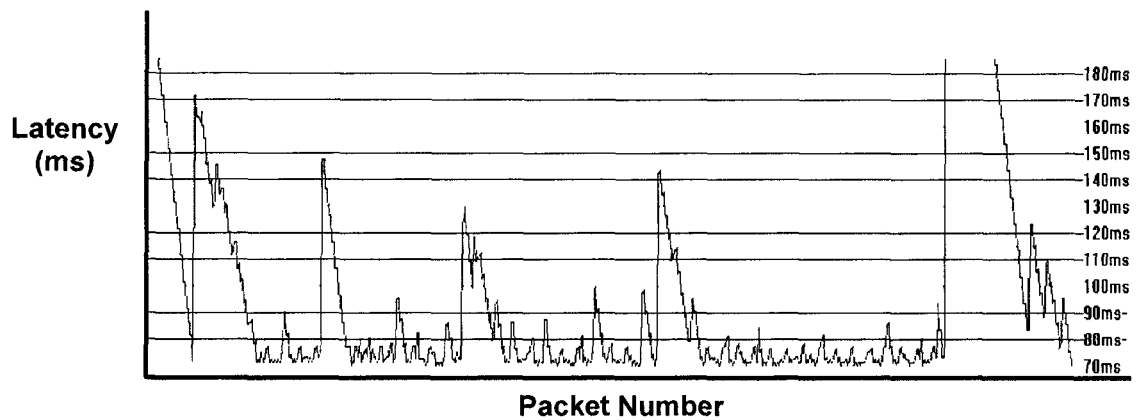
FIG. 5 depicts a graph of network latency example with very high jitter (a graph of time propagation for each packet).
Figure 6:
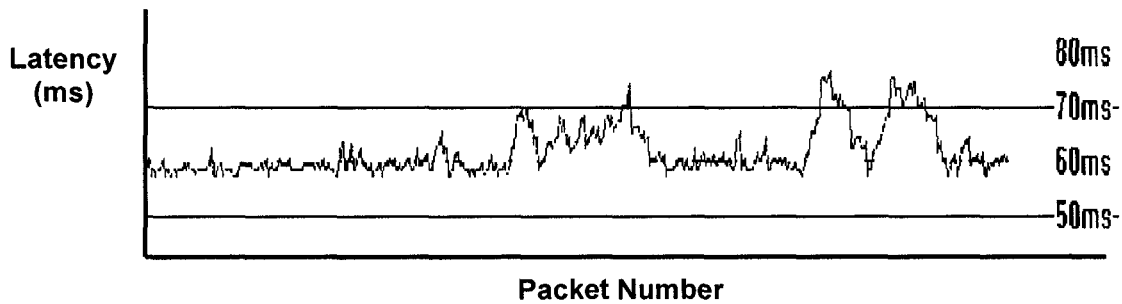
FIG. 6 depicts a graph of network latency example with very relatively low jitter (a graph of time propagation for each packet).

Synchronized Multi-Way Audio and Video Conferencing system which uses Internet Protocol for the transport of music data is prone to defects in audio and video quality due to random variations of latency across the transport path. These variations, called jitter, have spiky character depend on the traffic routes and are out of control of Synchronized Multi-Way Audio and Video Conferencing software. FIG. 5 depicts a graph of network latency example with very high jitter (a graph of time propagation for each packet). FIG. 6 depicts a graph of network latency example with very relatively low jitter (a graph of time propagation for each packet). Ways to manage jitter can be performed by the playout buffer module of FIG. 1 or the participating computer 204 of FIG. 2, including: receiving the audio signal; storing data from the audio signal in a jitter buffer; dynamically adjusting the size of the jitter buffer in order to address litter in the specific network, analyzing latency spikes of the audio signal in the specific network; determining that a given latency spike is beginning; predicting characteristics of the given latency spike; and changing the size of the litter buffer according to the predicted characteristics of the given latency spike.

The jitter can result in sound glitches and distortions. For example, if the latency suddenly increased to 100 ms the sound we have no sound to play during those 100 ms unless we have a sufficient supply of sound data. If we have no sound to play the short period of silence will appear as an unpleasant pop or a click or a glitch unless a special algorithm described below is applied.

The common way of addressing jitter problems is to have a sufficient supply of sound data so that we always have some sound to play. This technique is called buffering and the buffer is called "jitter buffer" and is commonly used in many Voice over IP applications.

Jitter buffer size is measured in milliseconds—the larger it is, the less the probability of glitches, but the more the overall latency of the system. For example, if jitter buffer size is 100 ms, then jitter less than 100 ms can be handled without sound distortions but the latency introduced by jitter buffer is also 100 ms.

In order to minimize the total latency the buffer size must dynamically change adapting to the changes of packet latency. This technique is commonly referred to as the 'adaptive jitter buffer'. In the ideal case the graph of the jitter buffer size must be exactly the same as the graph of the packet propagation latency in the given network scenario. The main problem is that both the moment of the "latency splash" and the size of the splash are completely unpredictable.

The jitter buffer algorithm of Synchronized Multi-Way Audio and Video Conferencing system proposed here has the goal to deliver the maximum quality of music being transmitted while maintaining minimal latency. The jitter buffer algorithm disclosed herein is performed by the playout buffer module. The algorithm has two parts: 1) analyzing the nature of latency spikes in the given network, predicting the main characteristics of the spike including determining spike size categories of the latency spikes as soon as a latency spike begins to appear, and changing the buffer size correspondingly; 2) synthesizing sound to play when the playout buffer 104 is empty due to a large spike.

1. The algorithm analyses latency statistics for the period of 1-5 minutes to determine the nature of spikes and calculates average jitter characteristics. There are 3 categories of spikes:

large (A category), medium (B category) and small spikes (C category). For each spike category A, B and C the algorithm determines average, minimum and maximum for the following values: spike peak (ms), duration between spikes, total duration of spike, spike "ascend time" (period of time from the moment when spike begins until the moment when it reaches its peak), spike "descend time" (period of time from the moment when spike reaches its peak until the moment it ends). A linear approximation is used to model spikes.

This data is used to predict the kind of spike as soon as it begins to appear and adjust jitter buffer size accordingly. The user of the Synchronized Multi-Way Audio and Video Conferencing system can select whether he/she prefers the minimal latency or the best quality. In this way the user indirectly affect the "insurance level" of the jitter buffer. The insurance level is a number of milliseconds in jitter buffer size beyond the current average latency, i.e. if the network latency is currently 10 ms and jitter buffer size is 30 ms, then the "insurance level" is 20 ms. In general the insurance level is being kept as low as possible (depending on the behavior of the network).

2. Sometimes spikes may exceed its peak levels and the playout buffer 104 may become empty. The Synchronized Multi-Way Audio and Video Conferencing system which takes sound quality as a high priority can't afford just to play the silence which would result in a pop or a click. An algorithm to synthesize short portions or pieces of music based on the previously played material is used to fill the gaps. Note that such algorithms are useful only for music transmission. For voice transmission you can use much simpler and more effective techniques which take advantages of the frequent pauses during the conversation. These pauses however don't take place during the musical performance and while people having a conversation over a VoIP solution can afford to make such pauses musicians can't because the performance will be ruined. So this is a novel approach which is only well-taken for real-time transmission of music data.

One embodiment teaches a method of filling such a gap. The method assumes generating a short fragment of sound based on fragments of the waveform played previously. This software-generated fragment of sound is 'smoothly glued' with the previously played sound and the sound which arrives later thus filling the gap. This approach allows not to resend packets and not to increase latency and to better synchronize sound streams from multiple participants.

The choice of the most suitable in terms of smooth splicing wave fragment is based on the minimization of the following discreet functional:

$$F(x) = \sum_{i=0}^{L} |W_{c+i} - W_{c+i-x}| \cdot \left[1 + \frac{P(L-i)}{2}(1 + \text{sign}(i - (L - X_0)))\right], \quad \text{Equation 3}$$

where $x \in [L, 2L]$

In Equation 3, c is the number of the samples on which the procedure of information recovery due to the playout buffer devastation is invoked, $W_k$ is the value of the discreet approximation of the wave function on sample k, L is the length of the "sound window" used to find the optimal (in terms of min F(x)) pre-granular sound fragment, x is discreet wave shift (in samples).

$$P_n(i) = \sum_{k=1}^{n} \frac{A_k(X_0 - i)^k}{X_0^k} - 1 \quad \text{Equation 4}$$

Equation 4 is an example of the weight function of the last $X_0$ samples.

By means of experimentation with various audio stream and music instruments the inventors have found out that as a result of the granular synthesis of sound a change in the spectrum of the resulting wave occurs. This effect occurs due to a finite size of a "sound window". The length of the sound windows L must be 50 ms or more to prevent the feeling of discomfort during the single and double granular sound synthesis (with that approach the base Fourier frequency of the resulting wave is less than 20 Hz, which is the lower limit of audibility for humans).

After the selection of the optimal time shift interval, the algorithm performs linear cross-mixing $W_k$ and $W'_k = W_{k-x}$ during 1-2 ms (backward time shift). When the amount of sound data in the playout buffer 104 exceeds a threshold value (about 30 ms), the algorithm performs a forward time shift in the same way as above ($W_k$ and $W'_k = W_{k+x}$) and performs linear cross-mixing during the time span of 20 ms.

A similar technique is used to repair the sound lost due to packet loss for those codecs that do not handle these losses. Suppose we have a contiguous sound stream, than a lost gap. While no further packets are received the playout buffer algorithm behaves as if a jitter spike had occurred. When the packet after the gap is received (we can determine the gap by the packet sequence number and by the start and length information stored inside packets) we should synthesize a sound to fill the gap. Using the above algorithm an appropriate sound before the gap is found, then it is cross-mixed with the entire last packet and with some sound before the gap (actually, with all the sound between the read cursor and the start of the gap, or 1 ms, which value is bigger)

III. Local Delay Module

LocalDelay introduces a delay to the local sound according to the synchronization algorithm (see N-way section below). This algorithm dynamically estimates the "common delay" according to the delays of incoming audio streams (from all remote peers). This "common delay" could be a mean value of the delays of the peers, maximum value of those delays or some composition of these values.

Local delay module can gradually change the value of delay introduced re-sampling 1000 samples to 1001 or 1000 samples to 999. This leads to increasing or decreasing the local delay by 1 ms per second. Also using the algorithm similar to the Playout Buffer's granular synthesis, local delay can instantly change its delay value by 10-20 ms. The local delay value should decrease while local musician is not playing to allow easier adaptation. The value to decrease the local delay should be adjustable between 0 ms and 70 ms. After the local musician started playing the local delay value should increase to the "common delay" estimated by the synchronization algorithm. This method allows reduce perception of overall system latency by synchronization musicians with the help of shared drum machine.

Figure 7:
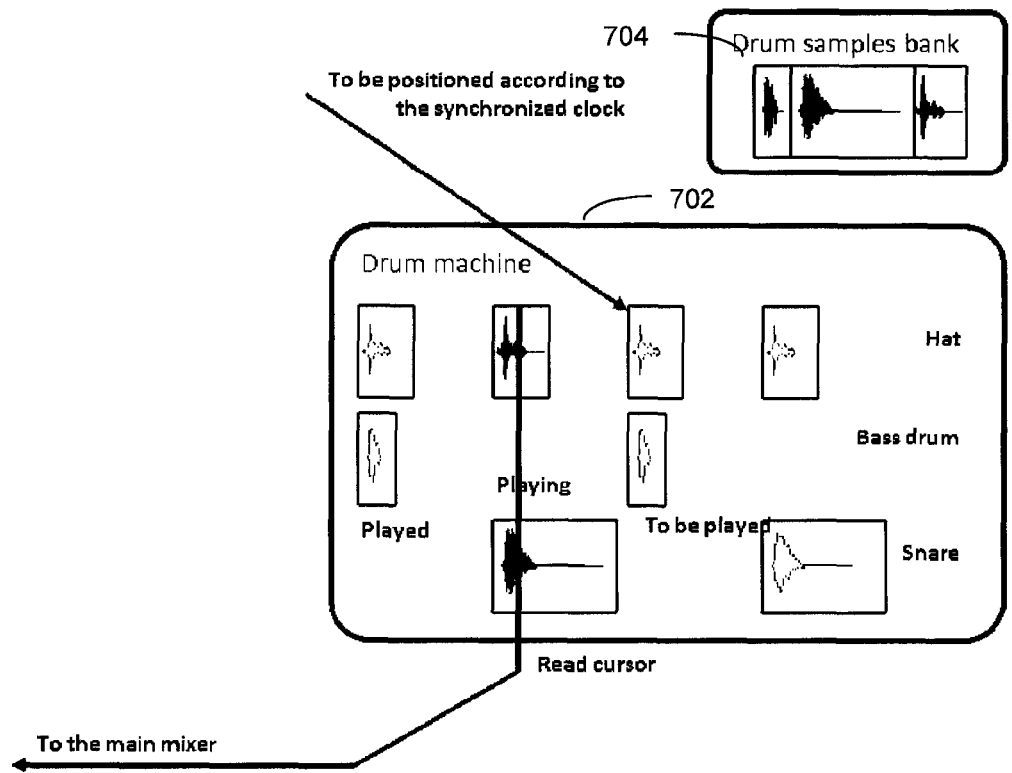
FIG. 7 depicts a diagram of an example of a shared drum machine.

FIG. 7 depicts a diagram of an example of a shared drum machine. Shared drum machine in this context is a set of recorded drum samples which are played simultaneously on all hosts. Drum samples are wave samples for different drums or metronome "tick" sound for synchronized metronome use. These samples encoded using our lossless audio codec and stored in a single file present a "samples bank" that can be easily shared among the performance participants. The musician combines different drum samples into single track then sequence of samples is transmitted to all hosts. For the playback of these samples a drum machine component is used. This component is capable of mixing large numbers of wave samples into an audio stream to be passed to the main mixer (see the diagram). Using the synchronized clock (see the corresponding section above), all the hosts' drum machines start to play the samples in a synchronized manner. As the drum samples are short wave samples (about a second or less), no resampling is needed Synchronized wave player is another enhancement of the synchronized drum machine and is used for orchestration or rhythm support during live music session. Wave track can be previously recorded by the system or can be any other file encoded in any format supported by the system. When a musician choose track the system transmits it to all the hosts involved in Synchronized Multi-Way Audio and Video Conferencing session. The file is decoded to PCM format and synchronization time-stamps are inserted into it. After session started stream mixer reports about time stamps played and re-samples wave stream as needed the same way as described in synchronized drum machine discussed above in this section.

IV. Mixer and Recording Synch Modules

Recording of live performances can be done in the client server manner, but this way it introduces dedicated server and accordingly reduces system scalability. Moreover client-server solution requires one more data channel that consumes additional bandwidth.

But from the other side recording performance locally on the client can add additional performance overhead which may produce audio glitches. It occurs due to many decode video/encode video procedures which are very CPU consuming tasks. In the current system another approach was invented. Deferred recording method is used. Recording process is split in 3 parts:

1. Storing both audio and video data from the network and from local video capture device and sound card on the local hard drive without any processing (encoded audio and video from remote participant and raw captured audio and video from local participant).

2. Playing stored audio and video without any processing. Synchronization between audio and video is achieved by time-stamping currently recording video frame by the number of the audio sample which is playing at the same moment.

3. Editing, mixing, encoding. This allows creating a multi-channel high-quality audio video recording which can be edited and remixed ever after by video mixing tool which is the part of the system.

4. Transmitting data to the web site backend.

All the peers store all the outgoing sound streams locally using our lossless audio format after the a/v conferencing session has stopped. All the audio channels and streams are stored separately from each other in the recording container file. The recording container file also stores all the output generated by the synchronization module. This data is used to synchronize mix the participants' audio and video streams. These files can be sent to one PC (a mixing server or of one of the players) where, using the synchronization data, audio streams could be easily synchronized and exported as tracks and a project file to any multi-channel audio software for further processing.

Figure 8:
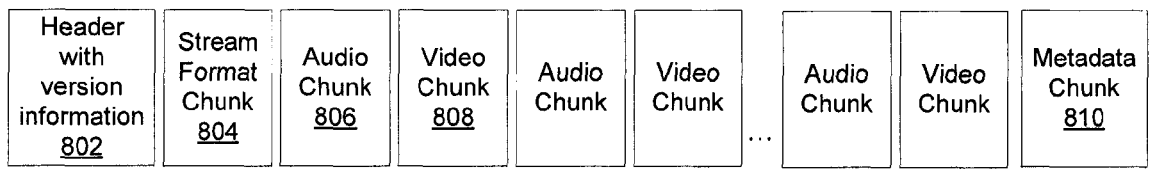
FIG. 8 depicts an example diagram of a detailed description of formats of the recording container file.

FIG. 8 depicts an example diagram of a detailed description of formats of the recording container file. Header with version information 802 contains 4 bytes protocol identifier and a 4 bytes version number. All other blocks on the diagram are so called chunks. Each chunk has type (4 bytes), size (4 bytes) and payload with size specified in chunk's "size" field. Payload is varying depending on the chunks type. If chunk type is unknown to the reader, it can skip the chunk by moving the file pointer. Stream Format Chunk 804 contains description of the audio and video streams i.e. codec, bitrates, image dimensions etc. Audio Chunk 806 and Video Chunk 808 each contain audio and video content. Metadata Chunk 810 contains metadata of the recording container file.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method for addressing jitter in an audio signal transmitted across a specific network, the method comprising:
    receiving the audio signal;
    storing data from the audio signal in a jitter buffer;
    dynamically adjusting the size of the jitter buffer in order to address jitter in the specific network, the dynamically adjusting including:
        analyzing characteristics of at least some latency spikes of the audio signal in the specific network;
        determining from the characteristics the nature of the latency spikes and calculating average jitter characteristics;
        generating models of the latency spikes based on the analyzed characteristics of the nature of the latency spikes and the calculated average jitter characteristics;
        organizing the generated models of the latency spikes into different latency spike categories;
        determining that a given latency spike is beginning;
        analyzing characteristics of the given latency spike to predict which latency spike category applies to the given latency spike; and
        changing the size of the jitter buffer according to the predicted latency spike category of the given latency spike.

2. A computer implemented method as recited in claim 1, further including synthesizing sound to play when the jitter buffer cannot provide playable audio signal.

3. A computer implemented method as recited in claim 1, wherein analyzing the characteristics comprises analyzing latency statistics for periods substantially within 1 minute to 5 minutes.

4. A computer implemented method as recited in claim 1, wherein analyzing the characteristics comprises analyzing latency statistics for one or more various periods.

5. A computer system addressing jitter in an audio signal received via a specific network, the computer system comprising:
    means for receiving the audio signal;
    means for storing data from the audio signal in a jitter buffer;
    means for dynamically adjusting the size of the jitter buffer in order to address jitter in the specific network, the means for dynamically adjusting including:
        means for analyzing characteristics of at least some latency spikes of the audio signal in the specific network;

means for determining from the characteristics the nature of the latency spikes and calculating average jitter characteristics;

means for generating models of the latency spikes based on the analyzed characteristics of the nature of the latency spikes and the calculated average jitter characteristics;

means for organizing the generated models of the latency spikes into different latency spike categories;

means for determining that a given latency spike is beginning;

means for analyzing characteristics of the given latency spike to predict which latency spike category applies to the given latency spike; and means for changing the size of the jitter buffer according to the predicted latency spike category of the given latency spike.

6. A computer system as recited in claim 5, further including means for synthesizing sound to play when the jitter buffer cannot provide playable audio signal.

7. A computer system as recited in claim 5, wherein analyzing the characteristics comprises analyzing latency statistics for periods substantially within 1 minute to 5 minutes.

8. A system as recited in claim 6, wherein analyzing the characteristics comprises analyzing latency statistics for one or more various periods.

9. A computer system for addressing jitter in a specific signal transmitted across a specific network, the computer system comprising:

means for receiving a media signal;

means for storing data from the media signal in a jitter buffer; and means for dynamically adjusting the jitter buffer in order to address jitter or jitter like effects in the specific network, said means for dynamically adjusting the jitter buffer including:

means for analyzing one or more characteristics of the media signal in the specific network;

means for determining from the characteristics of the media signal the nature of latency spikes associated with the media signal and calculating average jitter characteristics;

means for generating models of the latency spikes based on the analyzed characteristics of the media signal and the calculated average jitter characteristics;

means for organizing the generated models of the latency spikes into different latency spike categories;

means for analyzing at least some characteristics of an incoming latency spike to predict which latency spike category applies to the incoming latency spike; and means for adjusting the jitter buffer according to analysis of the one or more characteristics of the media signal in the specific network including the prediction of the incoming latency spike category.

10. A computer implemented method for providing a distributed communication session involving synchronization of media signals transmitted across a network by devices coupled to the network, the method comprising:

receiving a given media signal, the given media signal transmitted by a given device associated with a given participant of a given distributed communication session, the given distributed communication session supported by a given network;

processing the given media signal;

storing data from the given media signal;

analyzing the given network;

determining from the analysis of the given network the nature of network latency spikes and calculating average jitter characteristics associated with the given network;

classifying network latency spikes with respect to a plurality of network spike categories according to the nature of the network latency spikes and the calculated average jitter characteristics;

predicting one or more characteristics of the specific network including predicting a category of an incoming network latency spike with respect to the plurality of network spike categories;

in response to the category of the incoming network latency spike, dynamically adjusting how data from the media signal is processed and/or stored; and generating a localized media signal reflective of the given media signal.

11. A computer implemented method as recited in claim 10, wherein the given media signal is an audio signal.

12. A computer implemented method as recited in claim 11, wherein storing data from the given media signal includes storing data from the audio signal in a jitter buffer; and wherein dynamically adjusting how data from the given media signal is processed and/or stored includes dynamically adjusting the size of the jitter buffer in order to address jitter in the given network.

13. A computer implemented method as recited in claim 12, wherein dynamically adjusting the size of the jitter buffer in order to address jitter in the given network includes:

analyzing latency spikes of the audio signal in the given network;

determining that a given latency spike is beginning;

predicting characteristics of the given latency spike;

determining the category of the given latency spike based on the predicted characteristics of the given latency spike; and changing the size of the jitter buffer according to the predicted category of the given latency spike.

14. A computer implemented method as recited in claim 10, wherein the media signal is a video signal.

15. A computer implemented method as recited in claim 10, further including synthesizing sound to play when a playable audio signal isn't otherwise available.

16. A computer implemented method as recited in claim 10, wherein analyzing the characteristics comprises analyzing latency statistics for periods of substantially within 1 minute to 5 minutes.

17. A computer implemented method as recited in claim 10, wherein analyzing the characteristics comprises analyzing latency statistics for one or more various periods.

18. The computer system as recited in claim 9, further including means for synthesizing sound to play when the jitter buffer cannot provide a playable audio signal.

19. The computer system as recited in claim 9, further comprising means for determining an average jitter buffer size based on the characteristics of the media signal.

20. The computer system as recited in claim 19, further comprising means for adjusting the average jitter buffer size with respect to an average network latency.

* * * * *